(12) United States Patent
Shin et al.

(10) Patent No.: US 9,871,377 B2
(45) Date of Patent: Jan. 16, 2018

(54) DEVICE AND METHOD FOR COOPERATION CONTROL OF EMS AND DMS

(71) Applicant: Korea Electric Power Corporation, Seoul (KR)

(72) Inventors: Jeong-Hoon Shin, Daejeon (KR); Jae-Gul Lee, Daejeon (KR); Seung-Mook Baek, Daejeon (KR); Sang-Wook Han, Daejeon (KR); Ji-Young Song, Daejeon (KR); Tae-Kyun Kim, Daejeon (KR)

(73) Assignee: KOREA ELECTRIC POWER CORPORATION, Seoul (KR)

( * ) Notice: Subject to any disclaimer, the term of this patent is extended or adjusted under 35 U.S.C. 154(b) by 378 days.

(21) Appl. No.: 14/426,655

(22) PCT Filed: Sep. 17, 2013

(86) PCT No.: PCT/KR2013/008416
§ 371 (c)(1),
(2) Date: Mar. 6, 2015

(87) PCT Pub. No.: WO2014/046466
PCT Pub. Date: Mar. 27, 2014

(65) Prior Publication Data
US 2015/0214739 A1 Jul. 30, 2015

(30) Foreign Application Priority Data

Sep. 20, 2012 (KR) ........................ 10-2012-0104574

(51) Int. Cl.
*H02J 3/16* (2006.01)
*H02J 3/50* (2006.01)
(Continued)

(52) U.S. Cl.
CPC ................ *H02J 3/16* (2013.01); *G05B 15/02* (2013.01); *H02J 3/006* (2013.01); *H02J 3/50* (2013.01); *Y02E 40/34* (2013.01)

(58) Field of Classification Search
CPC ...... H02J 3/383; H02J 3/16; H02J 3/00; H02J 3/06; H02J 3/50; H02J 3/006; Y02E 10/563; Y02E 40/34; G05B 15/02
(Continued)

(56) References Cited

U.S. PATENT DOCUMENTS 6,912,889 B2* 7/2005 Staphanos .......... G05B 23/0208
73/23.2
8,046,111 B2 10/2011 Chang et al.
2010/0106338 A1 4/2010 Nam et al.

FOREIGN PATENT DOCUMENTS

JP 2002-300726 A 10/2002
JP 2012-039727 A 2/2012
(Continued)

OTHER PUBLICATIONS

Machine translation of <JP 2002300726 A>, Okada Yasuhiro et al., Oct. 11, 2002, 11 pages.*
(Continued)

*Primary Examiner* — Sean Shechtman
*Assistant Examiner* — Shon Foley
(74) *Attorney, Agent, or Firm* — McDermott Will & Emery LLP

(57) ABSTRACT

The device for cooperation control of the EMS and the DMS comprises: a calculation unit for calculating an AQI index on the basis of target system information and power flow calculation data; a determination unit which determines whether or not to perform reactive power cooperation control switching of the DMS on the basis of the calculated AQI index and the amount of needed local reserve reactive power
(Continued)

(Qreq), and which determines a suppliable reactive power capacity on the basis of the amount of needed local reserve reactive power (Qreq) and a suppliable reactive power range; and a control unit which transmits a cooperation control mode switching control signal so as to switch the DMS to a reactive power cooperation control mode if it is determined that reactive power cooperation control switching of the DMS is to be performed, and which controls the DMS to supply reactive power.

9 Claims, 10 Drawing Sheets

(51) Int. Cl.
  *G05B 15/02* (2006.01)
  *H02J 3/00* (2006.01)

(58) Field of Classification Search
  USPC .......................................................... 700/286
  See application file for complete search history.

(56) References Cited

FOREIGN PATENT DOCUMENTS

| KR | 2010-0047726 A | 5/2010 |
|---|---|---|
| KR | 10-0987167 B1 | 10/2010 |
| KR | 10-1039425 B1 | 6/2011 |

OTHER PUBLICATIONS

International Search Report and Written Opinion issued in International Application No. PCT/KR2013/008416 dated Nov. 18, 2013, with partial English translation.

* cited by examiner

DEVICE AND METHOD FOR COOPERATION CONTROL OF EMS AND DMS

RELATED APPLICATIONS

This application is the U.S. National Phase under 35 U.S.C. §371 of International Application No. PCT/KR2013/008416, filed on Sep. 17, 2013, which in turn claims the benefit of Korean Application No. 10-2012-0104574, filed on Sep. 20, 2012, the disclosures of which Applications are incorporated by reference herein.

TECHNICAL FIELD

The present invention relates generally to an apparatus and method for cooperative control of a smart Energy Management System (EMS) and a Distribution Management System (DMS) and, more particularly, to an apparatus and method for cooperative control of an EMS and a DMS, which cooperatively control the EMS and DMS to maintain the voltage quality of a power transmission system using the reactive power of a power distribution system in which distributed power sources are installed.

BACKGROUND ART

Voltage in a power system, unlike frequency, is regarded as a local problem. Accordingly, in order to maintain only the voltages of substations within a predetermined range, individual voltage compensators (e.g., a capacitor, a reactor, a Flexible AC transmission system (FACTS), etc.) are installed and operated in each substation.

An operating scheme using such a voltage compensator is effective from the standpoint of the maintenance of voltage for each substation, but is inefficiently operated at present because reactive power sources installed near the substation to maintain the voltage quality of the entire system are not taken into consideration.

Further, with the rapid development of Information Technology (IT) and high-speed computing technology, technologies for managing the voltage quality of the entire system via a Voltage Management System (hereinafter referred to as "VMS") have recently been developed. For example, the VMS divides the entire power system into a plurality of electrically isolated voltage control areas so as to manage voltage quality using voltage control. The VMS selects a representative substation of each voltage control area. The VMS cooperatively controls reactive power sources (e.g., power generators, capacitors, reactors, FACTS, etc.) installed in local systems so that the voltage of the selected representative substation is maintained at a uniform level (e.g., 1.0 per unit (p.u.)).

Such a VMS is configured to control the voltage of a power transmission substation (of 154 kV or more) and is operated in such a way that it is mounted on a central energy management system (hereinafter referred to as "EMS") or configured as a separate device. The EMS processes a 22.9 kV or less power distribution system as a load, and performs energy management via the Automatic Tap Changer (Automatic Voltage Regulator: AVR) of a transformer without including the power distribution system in an operation target. Here, an AVR is operated separately from the EMS and is configured to maintain a secondary side voltage of a 154 kV/22.9 kV transformer within a predetermined range.

In a power distribution system, various distributed power sources or microgrids (MGs) have become more popular and extensive and loop operations are made possible. Accordingly, a Distribution Management System (hereinafter referred to as "DMS") that will manage a complicated power distribution system, as in the case of the EMS of a power transmission system, has been developed.

As shown in FIG. 1, a current power grid 10 is connected to a plurality of loads 20 and a plurality of power generators 30 (e.g., distributed power sources, etc.). That is, the power grid 10 is additionally connected to distributed power sources such as wind power, photovoltaic, and tidal energy storage devices, and fuel cells.

Meanwhile, as shown in FIG. 2, in the power grid, an EMS 40 (or VMS) and a DMS 50 are installed and operated for the overall operation of a power system, including the maintenance of voltage quality of the power grid. That is, the EMS or VMS is connected to a power transmission system to maintain the voltage quality of the power transmission system, and the DMS is connected to a power distribution system to maintain the voltage quality of the power distribution system.

Here, as shown in FIG. 3, in the power transmission system, the EMS maintains the voltage quality of the power transmission system by performing voltage control based on respective voltage compensators installed in power transmission substations. Of course, as shown in FIG. 4, a voltage control scheme using the VMS may also be used instead of the voltage control scheme using voltage compensators.

Voltage control in the power transmission system using an EMS (or VMS) or voltage control in the power distribution system using a DMS is independently performed. However, the power transmission system and the power distribution system are connected to each other via a 154 kV/22.9 kV transformer, and thus the power transmission system may sufficiently utilize energy resources connected to the power distribution system if necessary.

The voltage of the power transmission system is suitably controlled for the purpose of maximally securing a dynamic reactive power reserve within the system so as to prevent a wide area power failure caused by voltage instability in the case of an accident from occurring by means of the EMS (or VMS).

In particular, when a power system is in a no, mat state without causing accidents (that is, a sufficient reactive power reserve is present in the system), it may be considered that the role of the EMS or DMS is desirably performed merely by maintaining its own individual function without mutual cooperative control. In contrast, in the case of an accident causing voltage instability (that is, when a reactive power reserve is inefficient), there is a problem in that it is impossible to compensate for reactive power by efficiently utilizing the resources of the system via cooperative control of the EMS and the DMS.

Meanwhile, the DMS connected to the power distribution system takes charge of complicated operation of the power distribution system including voltage control thereof. That is, the DMS cooperatively controls various distributed power sources and various voltage compensators connected to the power distribution system, thus maintaining the voltage of the power distribution system within the range of predetermined voltages.

Recently, as the number of various distributed power sources and reactive power compensators connected to the power distribution system has increased, a cooperative control regulation device for efficiently utilizing added resources (e.g., distributed power sources and reactive power compensators) is required. For example, Korean Patent Application Publication No. 10-2010-0047726 (entitled "Optimized Voltage control methodology through coordinated control of reactive power sources") discloses technology for performing cooperative control of reactive power sources using a variation in reactive power. Korean Patent No. 10-1039425 (entitled "System and method for controlling voltage of electric power system") discloses technology for performing cooperative control of reactive power sources using reactive power margin of the reactive power sources.

However, a problem arises in that, in the past, the power transmission system and the power distribution system perform cooperative control in consideration of only reactive power sources in each system, thus making it impossible to efficiently maintain the voltage quality of the entire power system, and making it difficult to cope with an increase in the number of reactive power sources.

DISCLOSURE

Technical Problem

The present invention has been made keeping in mind the above problems, and an object of the present invention is to provide an apparatus and method for cooperative control of an EMS and a DMS, which allow a power transmission system to supply insufficient reserves of the reactive power sources of a power distribution system, based on a reactive power reserve detected by the power transmission system and a required reactive power reserve calculated by the EMS.

Technical Solution

In order to accomplish the above object, an apparatus for cooperative control of an Energy Management System (EMS) and a Distribution Management System (DMS) according to an embodiment of the present invention includes an input unit for receiving EMS information from an EMS and DMS information from a DMS; a calculation unit for calculating an Area Q Index (AQI) based on target system information and flow calculation data included in the received EMS information; a determination unit for determining whether to switch the DMS to reactive power cooperative control, based on the calculated AQI and a required local reactive power reserve (Qreq) included in the received EMS information, and determining a suppliable reactive power amount based on the required local reactive power reserve (Qreq) included in the EMS information and a suppliable reactive power range included in the DMS information; and a control unit for, if it is determined to switch the DMS to reactive power cooperative control, transmitting a cooperative control mode switching control signal so that the DMS switches a mode thereof to a reactive power cooperative control mode, and controlling the DMS so that reactive power corresponding to the determined suppliable reactive power amount is supplied to an upper layer.

The input unit may receive EMS information including target system information, a local representative voltage reference value (Vref), flow calculation data, and a required local reactive power reserve (Qreq) from the EMS, and the input unit may receive DMS information including a reactive power control reference value (Qref) and a suppliable reactive power range.

The calculation unit may be configured to simplify a target local system to a single equivalent bus bar based on the target system information included in the EMS information, connect a virtual power generator to the equivalent bus bar, and perform flow calculation in each case while changing output of reactive power within a preset range.

The calculation unit may be configured to detect a vertex of a curve on an XY graph that is generated using a voltage value (Va) of a simplified target bus bar, among results of flow calculation, and a reactive power amount (Qc) of the virtual power generator, and calculate a magnitude of a y coordinate value of the vertex as the AQI.

The determination unit may be configured to, when the calculated AQI is less than a reactive power control reference value (Qref), determine to switch to reactive power cooperative control.

The determination unit may be configured to, if the required local reactive power reserve (Qreq) falls within the suppliable reactive power range, determine the required local reactive power reserve (Qreq) to be the suppliable reactive power amount, and if the required local reactive power reserve (Qreq) falls out of the suppliable reactive power range, determine a maximum value of the suppliable reactive power range to be the suppliable reactive power amount.

In order to accomplish the above object, a method for cooperative control of an Energy Management System (EMS) and a Distribution Management System (DMS) according to an embodiment of the present invention includes receiving, by an input unit, EMS information and DMS information; calculating, by a calculation unit, an Area Q Index (AQI) based on target system information and flow calculation data included in the received EMS information; determining, by a determination unit, whether to switch the DMS to reactive power cooperative control, based on the calculated AQI and a required local reactive power reserve (Qreq) included in the received EMS information; transmitting, by a control unit, a cooperative control mode switching control signal if it is determined to switch the DMS to reactive power cooperative control, thus enabling the DMS to switch a mode thereof to a reactive power cooperative control mode; determining, by the determination unit, a suppliable reactive power amount based on the required local reactive power reserve (Qreq) included in the EMS information and a suppliable reactive power range included in the DMS information; and controlling, by the control unit, the DMS so that reactive power corresponding to the determined suppliable reactive power amount is supplied to an upper layer.

Receiving may include receiving, by the input unit, EMS information including target system information, a local representative voltage reference value (Vref), flow calculation data, and a required local reactive power reserve (Qreq) from the EMS; and receiving, by the input unit, DMS information including a reactive power control reference value (Qref) and a suppliable reactive power range.

Calculating the AQI may include simplifying, by the calculation unit, a target local system to a single equivalent bus bar based on the target system information included in the EMS information; connecting, by the calculation unit, a virtual power generator to the equivalent bus bar, and then performing flow calculation in each case while changing output of reactive power within a preset range; generating, by the calculation unit, an XY graph using a voltage value (Va) of a simplified target bus bar, among results of flow calculation, and a reactive power amount (Qc) of the virtual power generator; detecting, by the calculation unit, a vertex of a curve on the XY graph; and calculating, by the calculation unit, a magnitude of a y coordinate value of the detected vertex as the AQI.

Determining whether to switch to reactive power cooperative control may include, determining, by the determination unit, to switch to reactive power cooperative control when the calculated AQI is less than a reactive power control reference value (Qref).

Determining the suppliable reactive power amount may include, if the required local reactive power reserve (Qreq) falls within the suppliable reactive power range, determining, by the determination unit, the required local reactive power reserve (Qreq) to be the suppliable reactive power amount, and if the required local reactive power reserve (Qreq) falls out of the suppliable reactive power range, determining, by the determination unit, a maximum value of the suppliable reactive power range to be the suppliable reactive power amount.

Advantageous Effects

In accordance with the present invention, the apparatus and method for cooperative control of an EMS and a DMS are advantageous in that cooperative control is performed such that a power transmission system supplies insufficient reserves of reactive power sources of a power distribution system, based on a reactive power reserve detected by the power distribution system and a required reactive power reserve calculated by the EMS, thus efficiently maintaining the voltage quality of the system, and even if the number of reactive power sources increases, efficiently maintaining the voltage quality of the system.

BEST MODE

Figure 1:
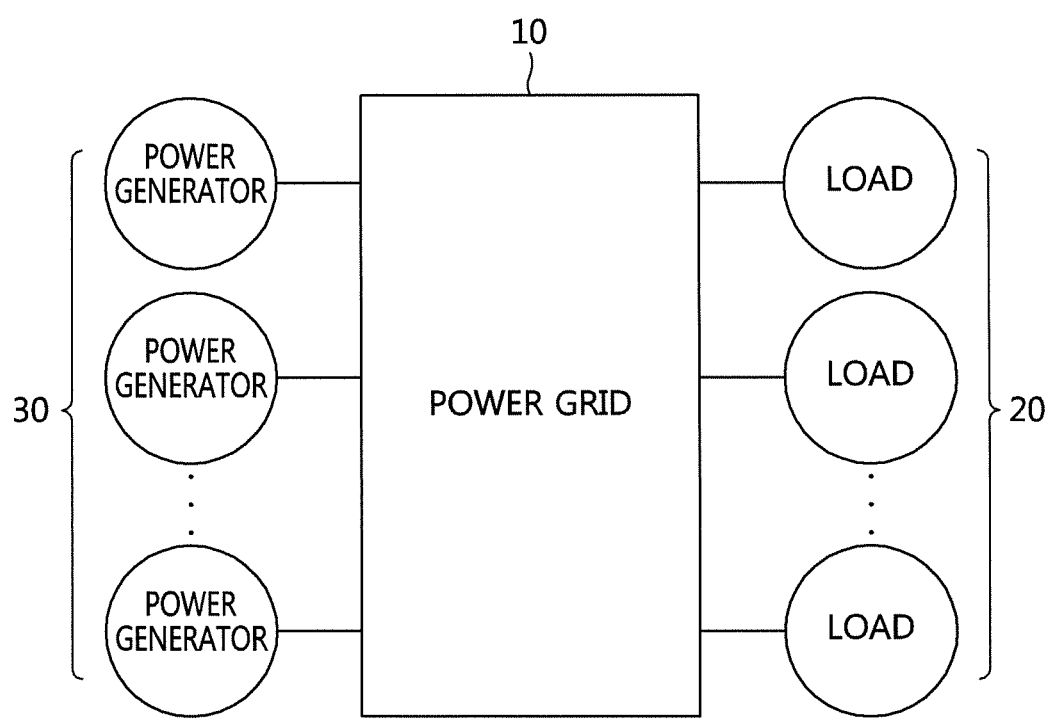
FIGS. 1 to 4 are diagrams showing a conventional cooperative control method.
Figure 2:
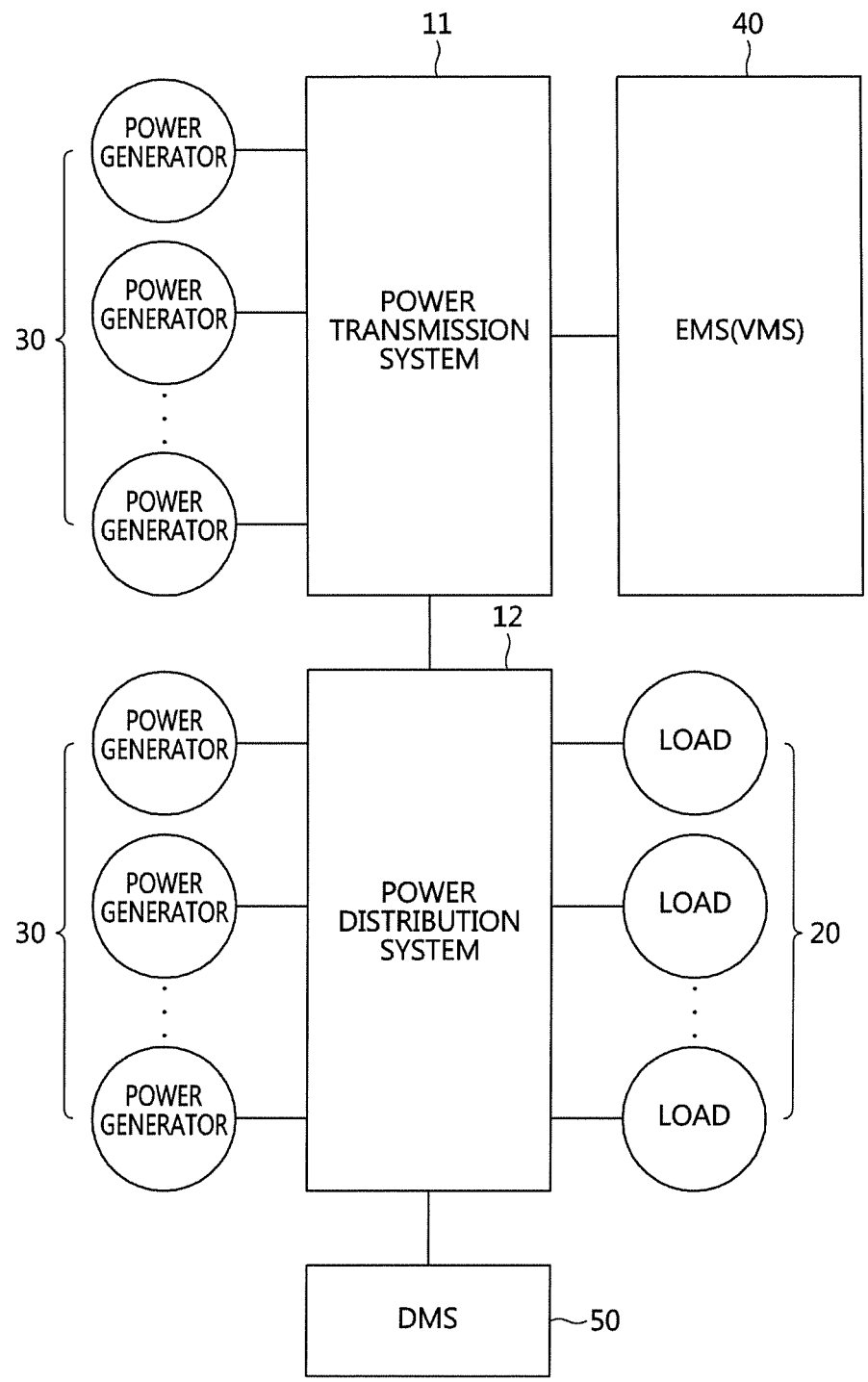
Figure 3:
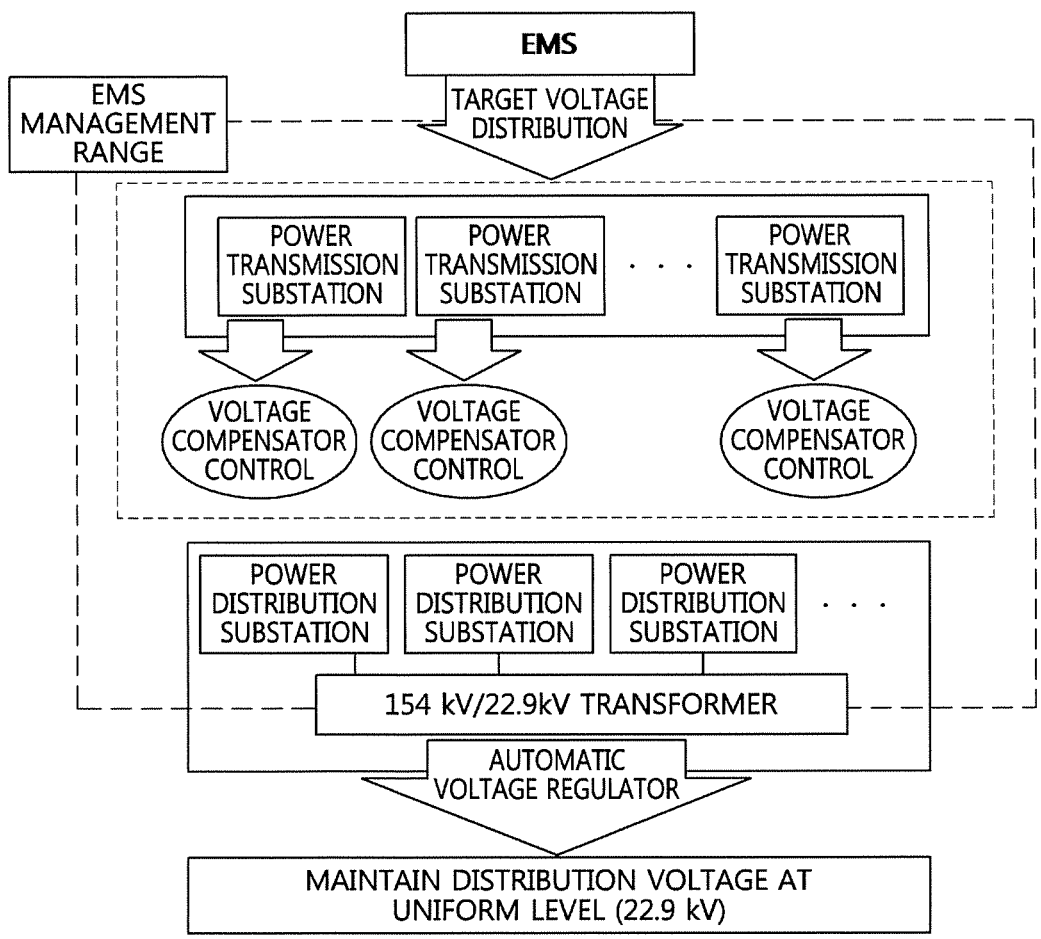
Figure 4:
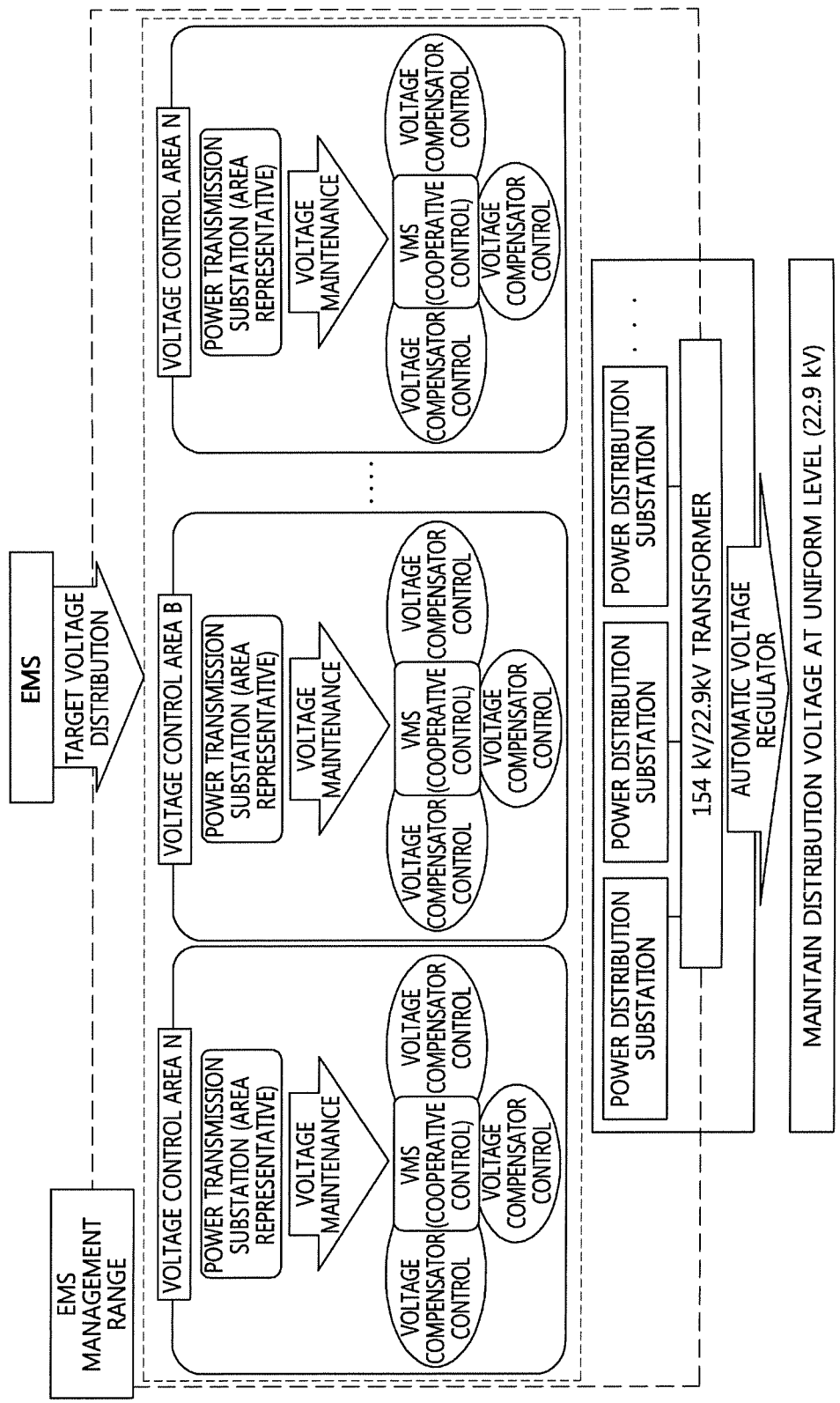

Embodiments of the present invention are described with reference to the accompanying drawings in order to describe the present invention in detail so that those having ordinary knowledge in the technical field to which the present invention pertains can easily practice the present invention. It should be noted that the same reference numerals are used to designate the same or similar elements throughout the drawings. In the following description of the present invention, detailed descriptions of known functions and configurations which are deemed to make the gist of the present invention obscure will be omitted.

Figure 5:
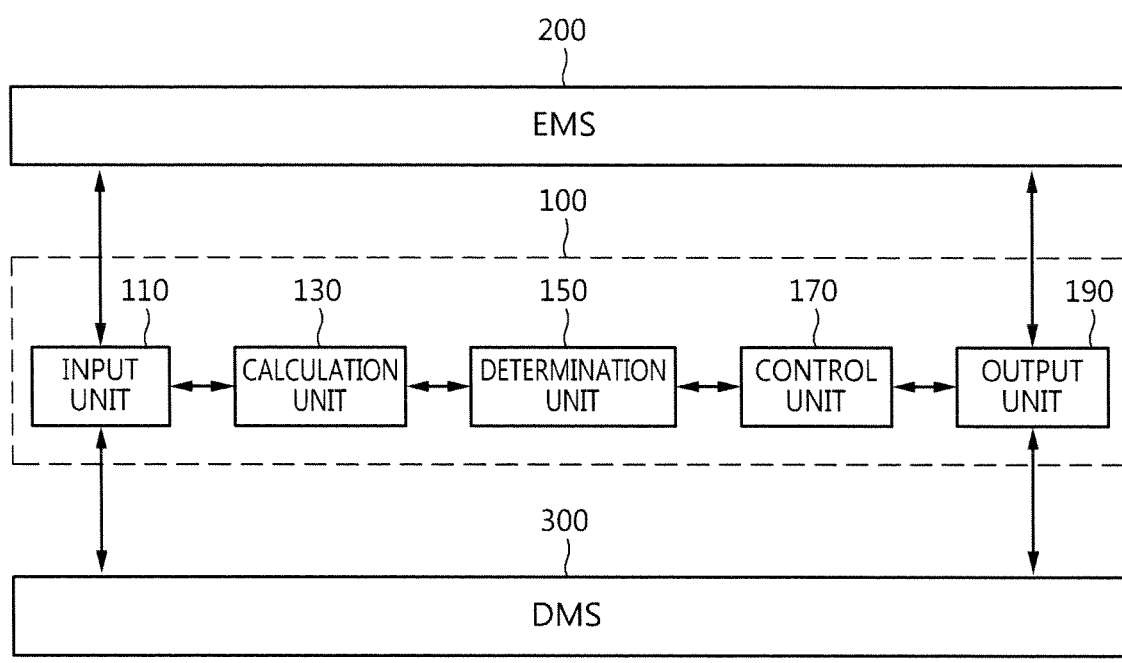
FIG. 5 is a block diagram showing an apparatus for cooperative control of an EMS and a DMS according to an embodiment of the present invention.
Figure 6:
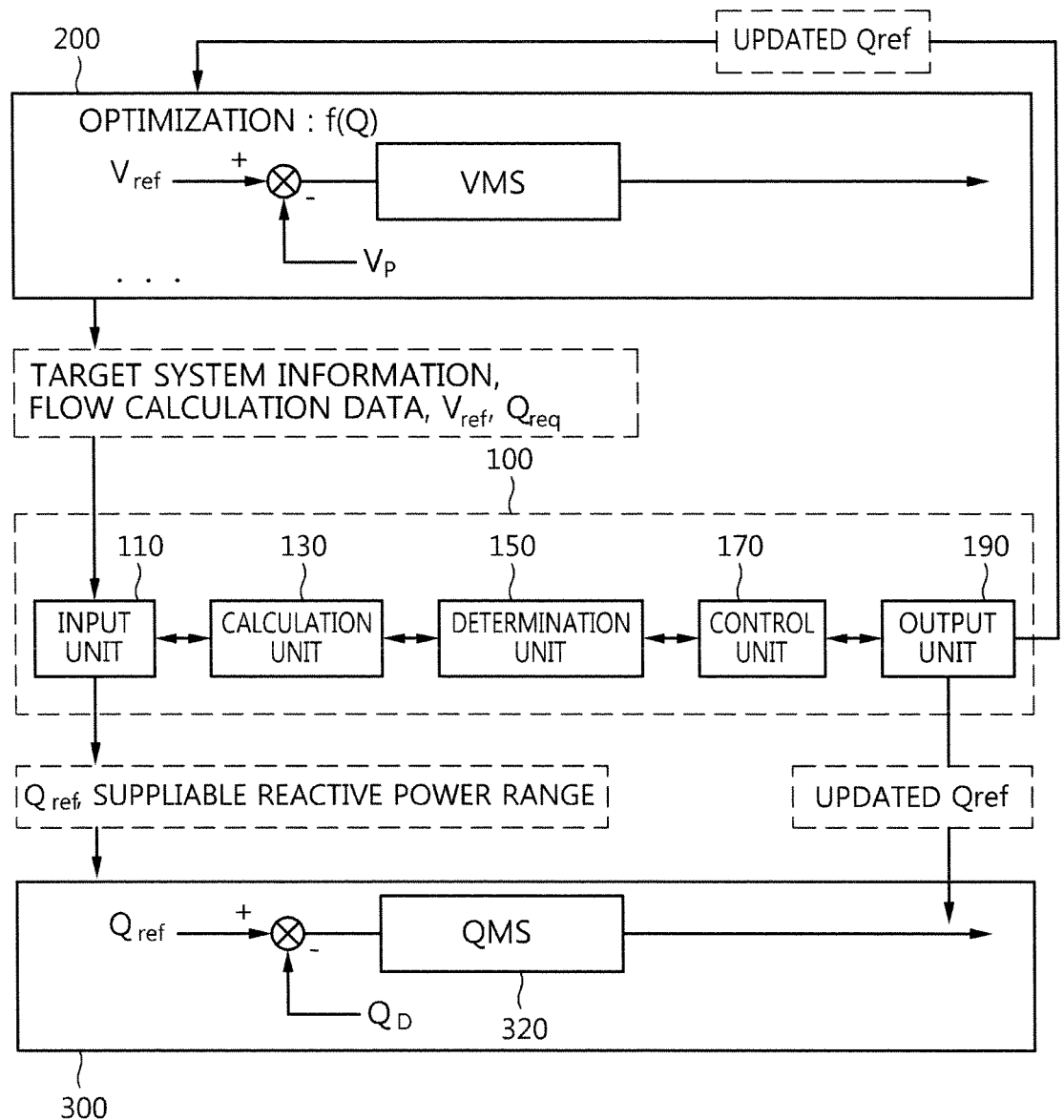
FIG. 6 is a diagram showing the input unit of FIG. 5.
Figure 7:
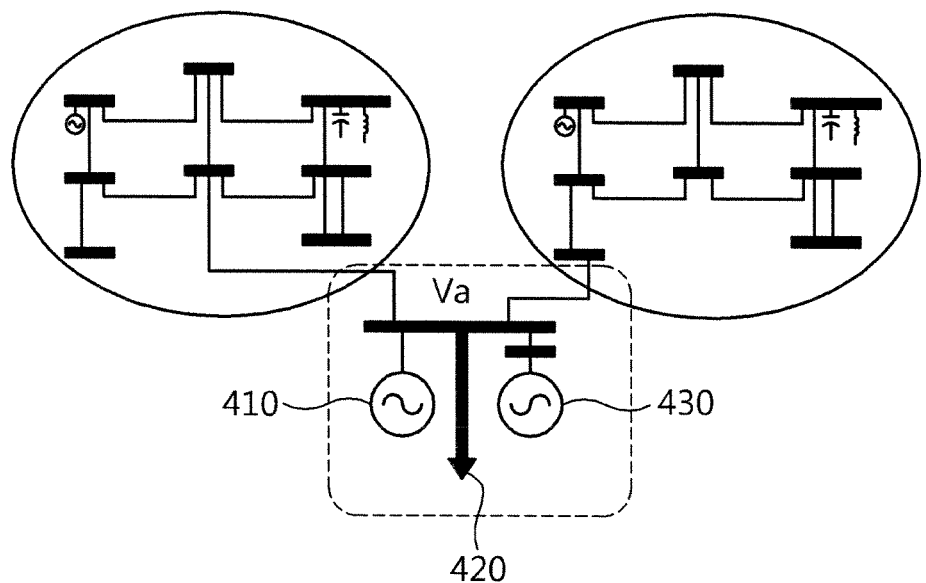
FIGS. 7 and 8 are diagrams showing the calculation unit of FIG. 5.
Figure 8:
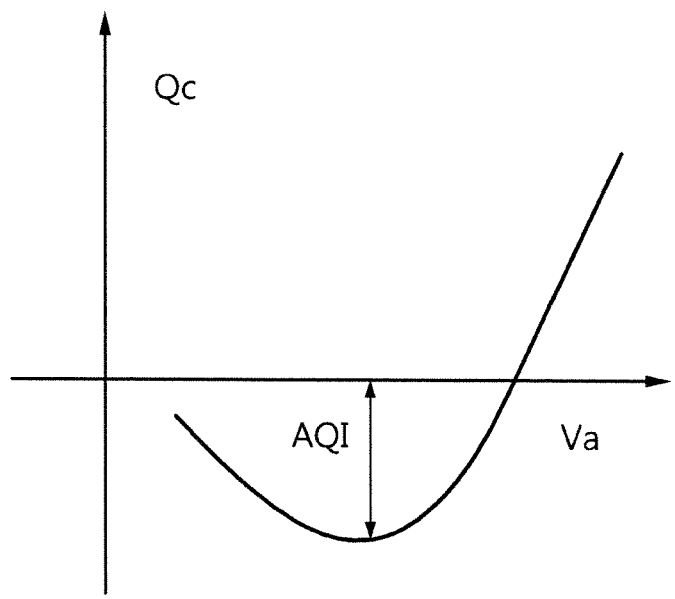

Hereinafter, an apparatus for cooperative control of an EMS and a DMS according to an embodiment of the present invention will be described in detail with reference to the attached drawings. FIG. 5 is a block diagram showing an apparatus for cooperative control of an EMS and a DMS according to an embodiment of the present invention. FIG. 6 is a diagram showing the input unit of FIG. 5, and FIGS. 7 and 8 are diagrams showing the calculation unit of FIG. 5.

As shown in FIG. 5, an apparatus 100 for cooperative control of an EMS and a DMS is configured to include an input unit 110, a calculation unit 130, a determination unit 150, a control unit 170, and an output unit 190. In this case, the EMS and DMS cooperative control apparatus 100 is installed in a central control center and each local feed center, and is connected to an EMS 200 and a DMS 300 through a communication line through which data (e.g., EMS information, DMS information, etc.) may be transmitted and received.

The input unit 110 receives EMS information for cooperative control of the EMS 200 and the DMS 300. That is, as shown in FIG. 6, the input unit 110 receives EMS information including target system information, a local representative voltage reference value Vref calculated using the optimization function of the EMS 200, flow calculation data required for Area Q Index (AQI) calculation, and a required local reactive power reserve Qreq from the EMS 200. In this case, the input unit 110 may receive EMS information further including a voltage allowable range and a measured representative voltage value $V_p$ from the EMS 200.

The input unit 110 receives DMS information for cooperative control of the EMS 200 and the DMS 300. That is, as shown in FIG. 6, the input unit 110 receives DMS information including a reactive power control reference value Qref and a suppliable reactive power range from the DMS 300. In this case, the input unit 110 may receive DMS information further including a transformer Automatic Voltage Regulator (AVR) control signal and a measured reactive power output value $Q_D$ from the DMS 300.

The calculation unit 130 calculates an AQI based on the target system information and the flow calculation data received through the input unit 110. That is, as shown in FIG. 7, the calculation unit 130 simplifies a target local system to a single equivalent bus bar (e.g., represented by an equivalent power source 410 and an equivalent load 420) based on the target system information. The calculation unit 130 designates a boundary line with a neighboring local system. The calculation unit 130 connects a virtual power generator 430 (or virtual synchronous phase modifier) to the bus bar, thus adjusting the output of reactive power to fall within a range from 0 to 500 Mega Volt Ampere Reactive (MVAR). The calculation unit 130 performs flow calculation in each case. As shown in FIG. 8, the calculation unit 130 indicates the voltage value Va of the simplified target bus bar and the reactive power amount Qc of the virtual power generator 430, among the results of flow calculation, on an XY graph. The calculation unit 130 calculates a vertex (dQc/dVa=0) of a curve indicated on the XY graph, and then calculates the magnitude of a y coordinate value (absolute value) of the vertex. The calculation unit 130 calculates the magnitude of the y coordinate value (absolute value) as an AQI.

The determination unit 150 determines whether to switch reactive power cooperative control of the DMS 300 (or Quality Management System: QMS 320), based on the AQI value calculated by the calculation unit 130 and the required local reactive power reserve Qreq received from the input unit 110. In this case, the determination unit 150 determines to switch to reactive power cooperative control of the DMS 300 (or QMS 320) if the AQI is less than the reactive power control reference value Qref.

The determination unit 150 determines the suppliable reactive power amount of the power distribution system based on the required local reactive power reserve Qreq received from the input unit 110 and the suppliable reactive power range. That is, the determination unit 150 compares the required local reactive power reserve Qreq with the suppliable reactive power range, and then determines a suppliable reactive power amount that indicates reactive power that is required by an upper-layer system and that can be supplied by the power distribution system. In this case, if the required local reactive power reserve Qreq falls within the suppliable reactive power range, the determination unit 150 determines the required local reactive power reserve Qreq to be the suppliable reactive power amount. In contrast, if the required local reactive power reserve Qreq falls out of the suppliable reactive power range, the determination unit 150 determines the maximum value (that is, Qref-max) of the suppliable reactive power range to be the suppliable reactive power amount.

If the determination unit 150 determines to switch to the reactive power cooperative control of the DMS 300, the control unit 170 generates a cooperative control mode switching control signal. The control unit 170 transmits the generated cooperative control mode switching control signal to the output unit 190. In this case, the control unit 170 sets a control signal, required to perform control such that the AVR of an upper-layer transformer is blocked, to the cooperative control mode switching control signal and transmits the control signal to the output unit 190. By means of this procedure, the control unit 170 switches the mode of the DMS 300 (or QMS 320) to the reactive power cooperative control mode.

The control unit 170 updates the suppliable reactive power amount determined by the determination unit 150 with the reactive power control reference value Qref. The control unit 170 transmits the updated reactive power control reference value Qref to the output unit 190. By means of this procedure, the control unit 170 performs control such that the DMS 300 (or QMS 320) supplies reactive power corresponding to the reactive power control reference value Qref to the upper-layer system (that is, the power transmission system).

When the transmission of the updated reactive power control reference value Qref is completed, the control unit 170 generates a recalculation request signal for the local representative voltage reference value Vref. The control unit 170 transmits the generated recalculation request signal to the output unit 190. The output unit 190 transmits the recalculation request signal to the EMS 200.

Accordingly, the EMS 200 receives the updated reactive power control reference value Qref from the DMS 300 so as to recalculate the local representative voltage reference value Vref using the optimization function.

The EMS 200 calculates a difference $\Delta Q$ between a previous reactive power control reference value Qref_old and the updated reactive power control reference value Qref, as given in the following Equation 1:

$$\Delta Q = Q_{ref\_old} - Q_{ref} \qquad \text{Equation 1}$$

The EMS 200 updates the system reactive power reserve Qmax by summing up difference values $\Delta Q$, as given in the following Equation 2:

$$Q_{max} = Q_{max} + \Delta Q \qquad \text{Equation 2}$$

Thereafter, the EMS 200 updates the previous reactive power control reference value Qref_old with the updated reactive power control reference value Qref to calculate a subsequent local representative voltage reference value Vref, as given in the following Equation 3:

$$Q_{ref\_old} = Q_{ref} \qquad \text{Equation 3}$$

Thereafter, the EMS 200 calculates the value (Q) of an objective function (the following Equation 4) while changing the voltage value Vp of each local representative bus bar.

$$Q = \text{MAX} \sum_{i=1}^{NAREA} \sum_{j=1}^{NGEN} (Q_{max,ij} - Q_{gen,ij}) \qquad \text{Equation 4}$$

The EMS 200 calculates the voltage value Vp of each local representative bus bar in which the calculated value Q of the objective function is maximized as the local representative voltage reference value Vref.

The output unit 190 transmits the cooperative control mode switching control signal received from the control unit 170 to the DMS 300 (or QMS 320). In this case, the output unit 190 sets a control signal, required to perform control such that the AVR of the upper-layer transformer is blocked, to the cooperative control mode switching control signal, and transmits the control signal to the DMS 300 (or QMS 320). Accordingly, the DMS 300 (or QMS 320) that receives the cooperative control mode switching control signal switches a mode to a cooperative control mode by blocking the operation of the AVR of the transformer.

The output unit 190 transmits the reactive power control reference value Qref received from the control unit 170 to the DMS 300 (or QMS 320). Accordingly, the DMS 300 (or QMS 320) cooperatively controls the reactive power sources in the power distribution system and supplies reactive power corresponding to the reactive power control reference value Qref received from the output unit 190 to the power transmission system.

The output unit 190 transmits the recalculation request signal received from the control unit 170 to the EMS 200. Accordingly, the EMS 200 that receives the recalculation request signal recalculates an optimization function required to determine the local representative voltage reference value Vref, and then updates the local representative voltage reference value Vref.

Figure 9:
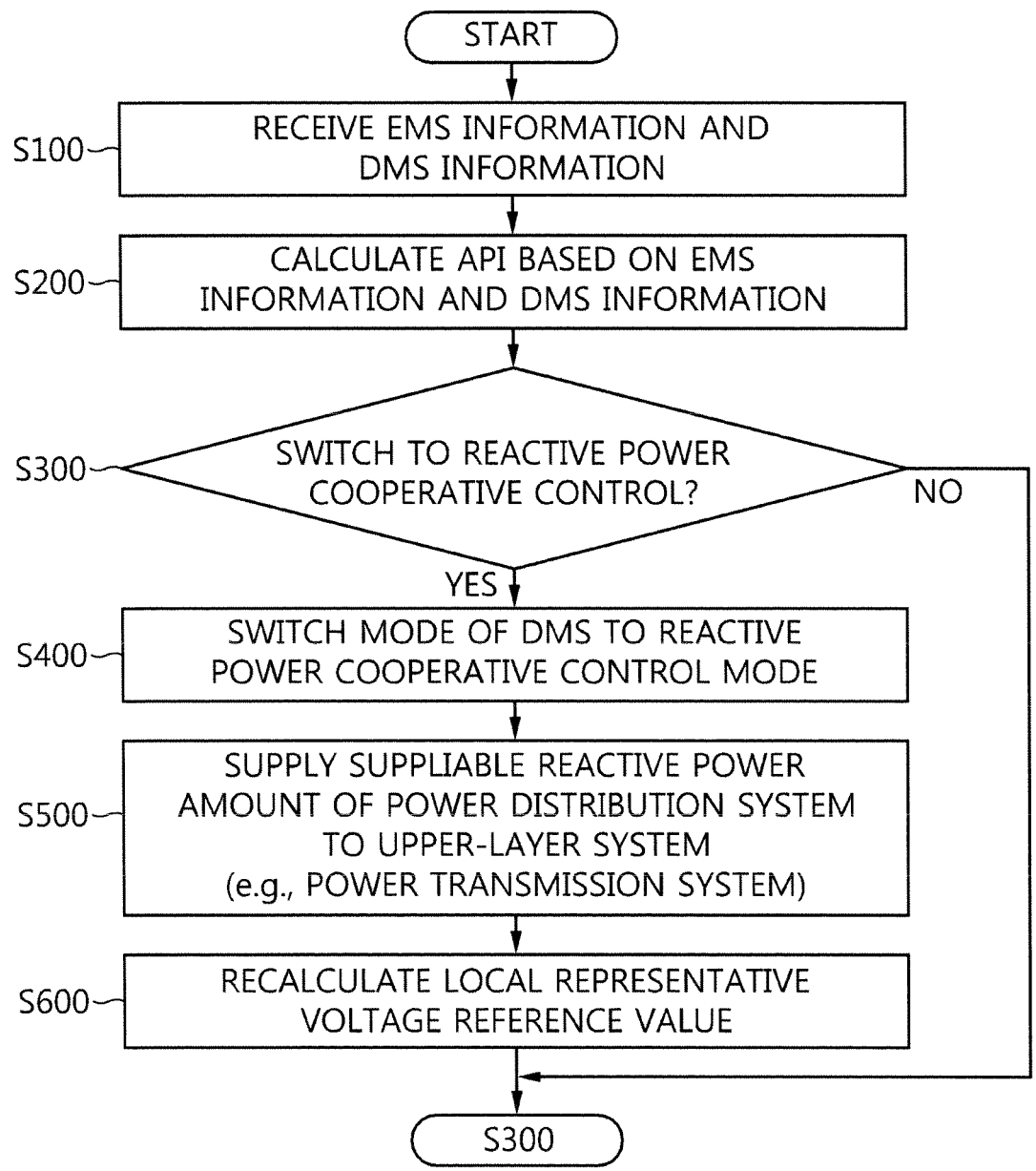
FIG. 9 is a flowchart showing a method for cooperative control of an EMS and a DMS according to an embodiment of the present invention.
Figure 10:
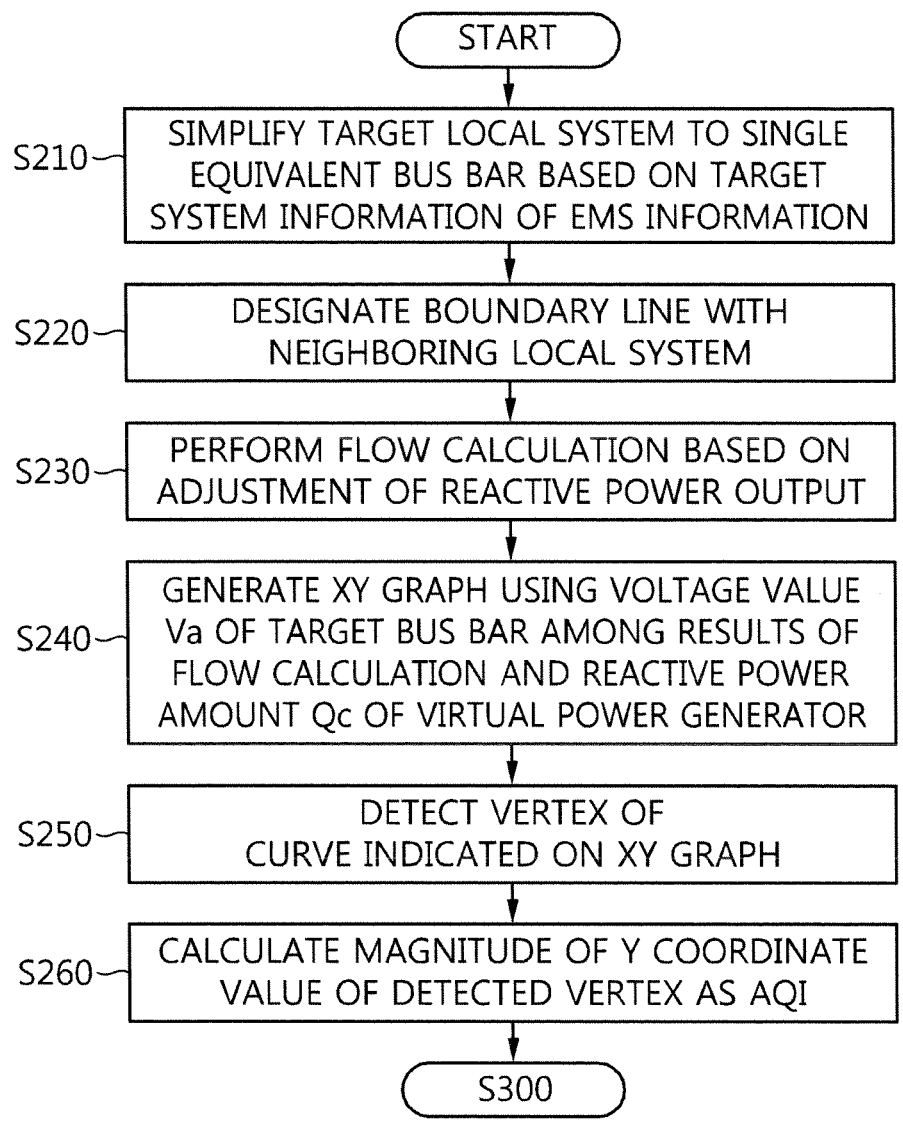
FIG. 10 is a flowchart showing the AQI calculation step of FIG. 9.
Figure 11:
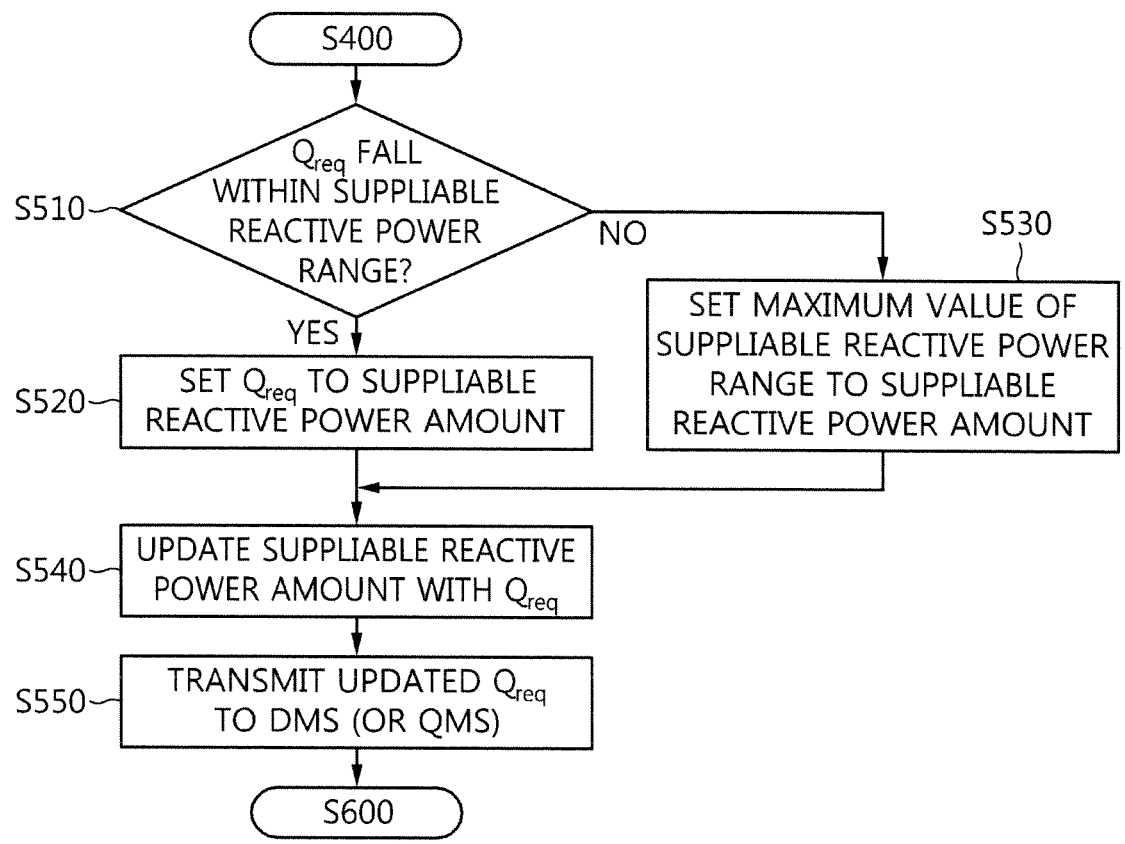
FIG. 11 is a flowchart showing the step of supplying a suppliable reactive power amount to an upper-layer system in FIG. 9.

Hereinafter, a method for cooperative control of an EMS and a DMS according to an embodiment of the present invention will be described in detail with reference to the attached drawings. FIG. 9 is a flowchart showing a method for cooperative control of an EMS and a DMS according to an embodiment of the present invention. FIG. 10 is a flowchart showing the AQI calculation step of FIG. 9, and FIG. 11 is a flowchart showing the step of supplying a suppliable reactive power amount to an upper-layer system in FIG. 9.

First, the cooperative control apparatus 100 receives EMS information from the EMS 200, and receives DMS information from the DMS 300 at step S100. That is, the input unit 110 receives, from the EMS 200, EMS information including target system information, a local representative voltage reference value Vref calculated using the optimization function of the EMS 200, flow calculation data required for calculation of an AQI, and a required local reactive power reserve Qreq. The input unit 110 receives, from the DMS 300, DMS information including a reactive power control reference value Qref and a suppliable reactive power range.

The cooperative control apparatus 100 calculates an AQI based on the input EMS information and DMS information at step S200. That is, the calculation unit 130 calculates the AQI based on the target system information and flow calculation data included in the EMS information. This procedure will be described in greater detail below with reference to FIG. 10.

The calculation unit 130 simplifies a target local system to a single equivalent bus bar based on the target system information at step S210, and designates a boundary line with a neighboring local system at step S220.

The calculation unit 130 connects a virtual power generator 430 (or virtual synchronous phase modifier) to the bus bar, thus adjusting the output of reactive power to fall within a range from 0 to 500 MVAR. The calculation unit 130 performs flow calculation in each case based on the adjustment of the reactive power output at step S230.

The calculation unit 130 generates an XY graph using the voltage value Va of the simplified target bus bar among the results of flow calculation and the reactive power amount Qc of the virtual power generator 430 at step S240.

The calculation unit 130 detects a vertex (dQc/dVa=0) of a curve indicated on the XY graph at step S250, and calculates the magnitude (absolute value) of a y coordinate value of the detected vertex as the AQI at step S260.

The cooperative control apparatus 100 determines whether to switch the EMS 200 to reactive power cooperative control, based on the calculated AQI value and the EMS information at step S300. That is, the determination unit 150 determines whether to switch the DMS 300 (or QMS 320) to reactive power cooperative control based on the AQI value and the required local reactive power reserve Qreq. In this case, the determination unit 150 determines to switch the DMS 300 (or QMS 320) to the reactive power cooperative control if the AQI value is less than the reactive power control reference value Qref.

If it is determined to switch to reactive power cooperative control (Yes at step S300), the cooperative control apparatus 100 controls the DMS 300 so that the mode of the DMS 300 switches to the reactive power cooperative control mode at step S400. That is, if it is determined by the determination unit 150 to switch the DMS 300 to the reactive power cooperative control, the control unit 170 generates a cooperative control mode switching control signal. The control unit 170 transmits the generated cooperative control mode switching control signal to the output unit 190. The output unit 190 transmits the cooperative control mode switching control signal received from the control unit 170 to the DMS 300 (or QMS 320). Here, the output unit 190 sets a control signal, required to perform control such that the AVR of the upper-layer transformer is blocked, to the cooperative control mode switching control signal, and transmits the control signal to the DMS 300 (or QMS 320). Accordingly, the DMS 300 (or QMS 320) that receives the cooperative control mode switching control signal switches the mode thereof to the cooperative control mode by blocking the operation of the transformer AVR.

The cooperative control apparatus 100 performs controls such that the suppliable reactive power amount of the power distribution system is supplied to an upper-layer system (e.g., power transmission system) at step S500. This procedure will be described in detail below with reference to FIG. 11.

The determination unit 150 compares the required local reactive power reserve Qreq with the suppliable reactive power range. Here, the determination unit 150 determines whether the required local reactive power reserve Qreq falls within the suppliable reactive power range. If it is determined by the determination unit 150 that the required local reactive power reserve Qreq falls within the suppliable reactive power range (Yes at step S510), the control unit 170 sets the required local reactive power reserve Qreq to the suppliable reactive power amount at step S520.

If the required local reactive power reserve Qreq falls out of the suppliable reactive power range, the control unit 170 sets the maximum value of the suppliable reactive power range to the suppliable reactive power amount at step S530.

The control unit 170 updates the set suppliable reactive power amount with the reactive power control reference value Qref at step S540.

The control unit 170 transmits the updated reactive power control reference value Qref to the output unit 190. The output unit 190 transmits the reactive power control reference value Qref received from the control unit 170 to the DMS 300 (or QMS 320) at step S550. Accordingly, the DMS 300 (or QMS 320) cooperatively controls the reactive power sources within the power distribution system and supplies the reactive power corresponding to the reactive power control reference value Qref received from the output unit 190 to the power transmission system.

Thereafter, the cooperative control apparatus 100 transmits a recalculation request signal for the local representative voltage reference value Vref to the EMS 200 at step S600. That is, if the transmission of the updated reactive power control reference value Qref has been completed, the control unit 170 generates the recalculation request signal for the local representative voltage reference value Vref. The control unit 170 transmits the generated recalculation request signal to the output unit 190. The output unit 190 transmits the recalculation request signal received from the control unit 170 to the EMS 200. Accordingly, the EMS 200 that receives the recalculation request signal recalculates an optimization function for determining a local representative voltage reference value Vref and updates the local representative voltage reference value Vref.

As described above, the apparatus and method for cooperative control of an EMS and a DMS are advantageous in that cooperative control is performed such that a power transmission system supplies insufficient reserves of reactive power sources of a power distribution system, based on a reactive power reserve detected by the power distribution system and a required reactive power reserve calculated by the EMS, thus efficiently maintaining the voltage quality of the system, and even if the number of reactive power sources increases, efficiently maintaining the voltage quality of the system.

An advertising service provision method including the apparatus and method for cooperative control of the present invention may be implemented as program instructions that can be executed by various computer means and may be recorded on a computer-readable storage medium. The computer-readable storage medium may include program instructions, data files, and data structures solely or in combination. Program instructions recorded on the storage medium may have been specially designed and configured for the present invention, or may be known to or available to those who have ordinary knowledge in the field of computer software. Examples of the computer-readable storage medium include all types of hardware devices specially configured to record and execute program instructions, such as magnetic media, such as a hard disk, a floppy disk, and magnetic tape, optical media, such as compact disk (CD)-read only memory (ROM) and a digital versatile disk (DVD), magneto-optical media, such as a floptical disk, ROM, random access memory (RAM), and flash memory. Examples of the program instructions include machine code, such as code created by a compiler, and high-level language code executable by a computer using an interpreter. The hardware devices may be configured to operate as one or more software modules in order to perform the operation of the present invention, and the vice versa.

The instructions of principles of the present invention may be implemented as combinations of hardware and software. Further, software may be implemented as an application program actually running on a program storage unit. The application program may be uploaded to a machine including any suitable architecture and executed by the machine. Preferably, a machine may be implemented on a computer platform having hardware such as one or more CPUs, computer processors, RAM, and Input/output (I/O) interfaces. Further, the computer platform may include an operating system and micro-instruction codes. Various processes and functions described here may be part of micro-instruction codes or part of application programs, or any combinations thereof, and may be executed by various processing devices including CPUs. Furthermore, various other peripherals such as an additional data storage unit and printer may be connected to the computer platform.

Since part of the configuration systems, components and methods illustrated in the attached drawings are implemented using software, it should be additionally understood that actual connections between system components or process function blocks may be varied according to the scheme in which the principles of the present invention are programmed. When such instructions are given, those skilled in the art will be able to consider the principles of the present invention and similar embodiments or configurations.

Although preferred embodiments of the present invention have been described, the present invention may be modified in various forms, and it is understood that those skilled in the art will practice various modifications and changes of the present invention without departing the scope of the accompanying claims of the present invention.

The invention claimed is:

1. An apparatus for cooperative control of an Energy Management System (EMS) and a Distribution Management System (DMS), comprising:
   an input device for receiving EMS information from an EMS and DMS information from a DMS; and
   a controller for (i) calculating an Area Q Index (AQI) based on target system information and flow calculation data included in the received EMS information,
   (ii) determining whether to switch the DMS to reactive power cooperative control, based on the calculated AQI and a required local reactive power reserve (Qreq) included in the received EMS information, and determining a suppliable reactive power amount based on the required local reactive power reserve (Qreq) included in the EMS information and a suppliable reactive power range included in the DMS information, and
   (iii) transmitting a cooperative control mode switching control signal so that the DMS switches a mode thereof to a reactive power cooperative control mode, and controlling the DMS so that reactive power corresponding to the determined suppliable reactive power amount is supplied to an upper layer, if it is determined to switch the DMS to reactive power cooperative control,
   wherein the controller is configured to further calculate the AQI based on simplifying a target local system to a single equivalent bus bar based on the target system information included in the EMS information, connecting a virtual power generator to the equivalent bus bar, and performing flow calculation in each case while changing output of reactive power within a preset range.

2. The apparatus of claim 1, wherein:
   the input device receives EMS information including target system information, a local representative voltage reference value (Vref), flow calculation data, and a required local reactive power reserve (Qreq) from the EMS, and
   the input device receives DMS information including a reactive power control reference value (Qref) and a suppliable reactive power range.

3. The apparatus of claim 1, wherein the controller is configured to detect a vertex of a curve on an XY graph that is generated using a voltage value (Va) of a simplified target bus bar, among results of flow calculation, and a reactive power amount (Qc) of the virtual power generator, and calculate a magnitude of a y coordinate value of the vertex as the AQI.

4. The apparatus of claim 1, wherein the controller is configured to, when the calculated AQI is less than a reactive power control reference value (Qref), determine to switch to reactive power cooperative control.

5. The apparatus of claim 1, wherein the controller is configured to:
   determine the required local reactive power reserve (Qreq) to be the suppliable reactive power amount if the required local reactive power reserve (Qreq) falls within the suppliable reactive power range, and
   determine a maximum value of the suppliable reactive power range to be the suppliable reactive power amount if the required local reactive power reserve (Qreq) falls out of the suppliable reactive power range.

6. A method for cooperative control of an Energy Management System (EMS) and a Distribution Management System (DMS), comprising:
   receiving, by an input device, EMS information and DMS information;
   calculating, by a controller, an Area Q Index (AQI) based on simplifying a target local system to a single equivalent bus bar based on the target system information included in the EMS information, connecting a virtual power generator to the equivalent bus bar, and performing flow calculation in each case while changing output of reactive power within a preset range;
   determining, by the controller, whether to switch the DMS to reactive power cooperative control, based on the calculated AQI and a required local reactive power reserve (Qreq) included in the received EMS information;
   transmitting, by the controller, a cooperative control mode switching control signal if it is determined to switch the DMS to reactive power cooperative control, thus enabling the DMS to switch a mode thereof to a reactive power cooperative control mode;
   determining, by the controller, a suppliable reactive power amount based on the required local reactive power reserve (Qreq) included in the EMS information and a suppliable reactive power range included in the DMS information; and
   controlling, by the controller, the DMS so that reactive power corresponding to the determined suppliable reactive power amount is supplied to an upper layer,
   wherein determining whether to switch to reactive power cooperative control comprises, determining, by the controller, to switch to reactive power cooperative control when the calculated AQI is less than a reactive power control reference value (Qref).

7. The method of claim 6, wherein receiving comprises:
receiving, by the input device, EMS information including target system information, a local representative voltage reference value (Vref), flow calculation data, and a required local reactive power reserve (Qreq) from the EMS; and
receiving, by the input device, DMS information including a reactive power control reference value (Qref) and a suppliable reactive power range.

8. The method of claim 6, wherein calculating the AQI further comprises:
generating, by the controller, an XY graph using a voltage value (Va) of a simplified target bus bar, among results of flow calculation, and a reactive power amount (Qc) of the virtual power generator;
detecting, by the controller, a vertex of a curve on the XY graph; and
calculating, by the controller, a magnitude of a y coordinate value of the detected vertex as the AQI.

9. The method of claim 6, wherein determining the suppliable reactive power amount comprises:
if the required local reactive power reserve (Qreq) falls within the suppliable reactive power range, determining, by the controller, the required local reactive power reserve (Qreq) to be the suppliable reactive power amount, and
if the required local reactive power reserve (Qreq) falls out of the suppliable reactive power range, determining, by the controller, a maximum value of the suppliable reactive power range to be the suppliable reactive power amount.

* * * * *